Oct. 21, 1947.  J. O. SAVAGE  2,429,298
PULVERIZING DISC PLOW
Filed Oct. 8, 1945  4 Sheets-Sheet 2
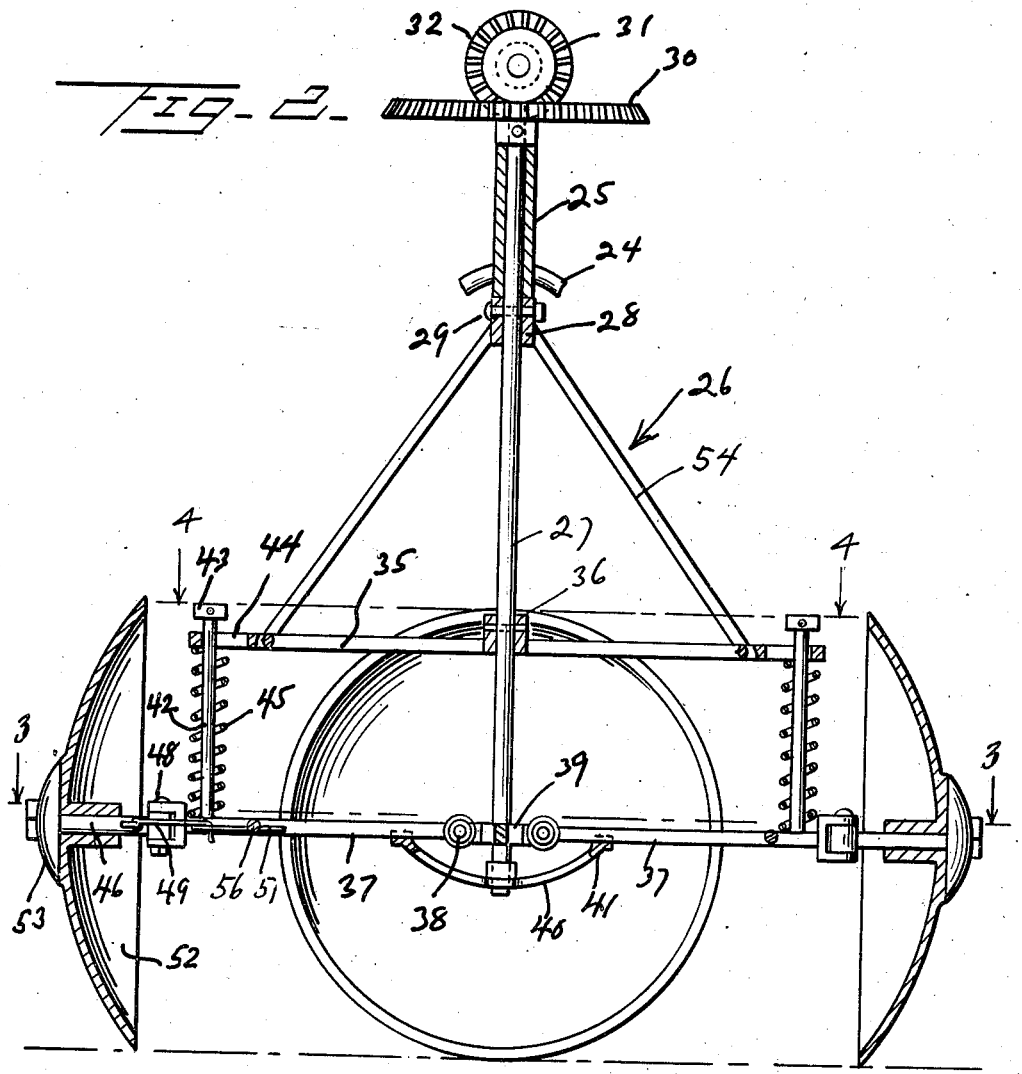
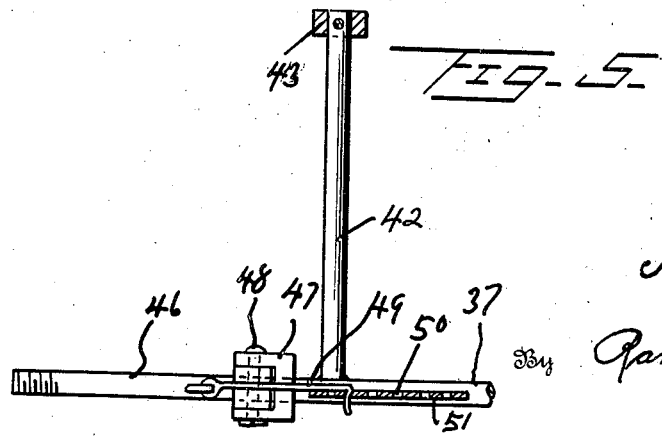
Inventor
J. O. Savage
By Randolph & Beavers
Attorneys

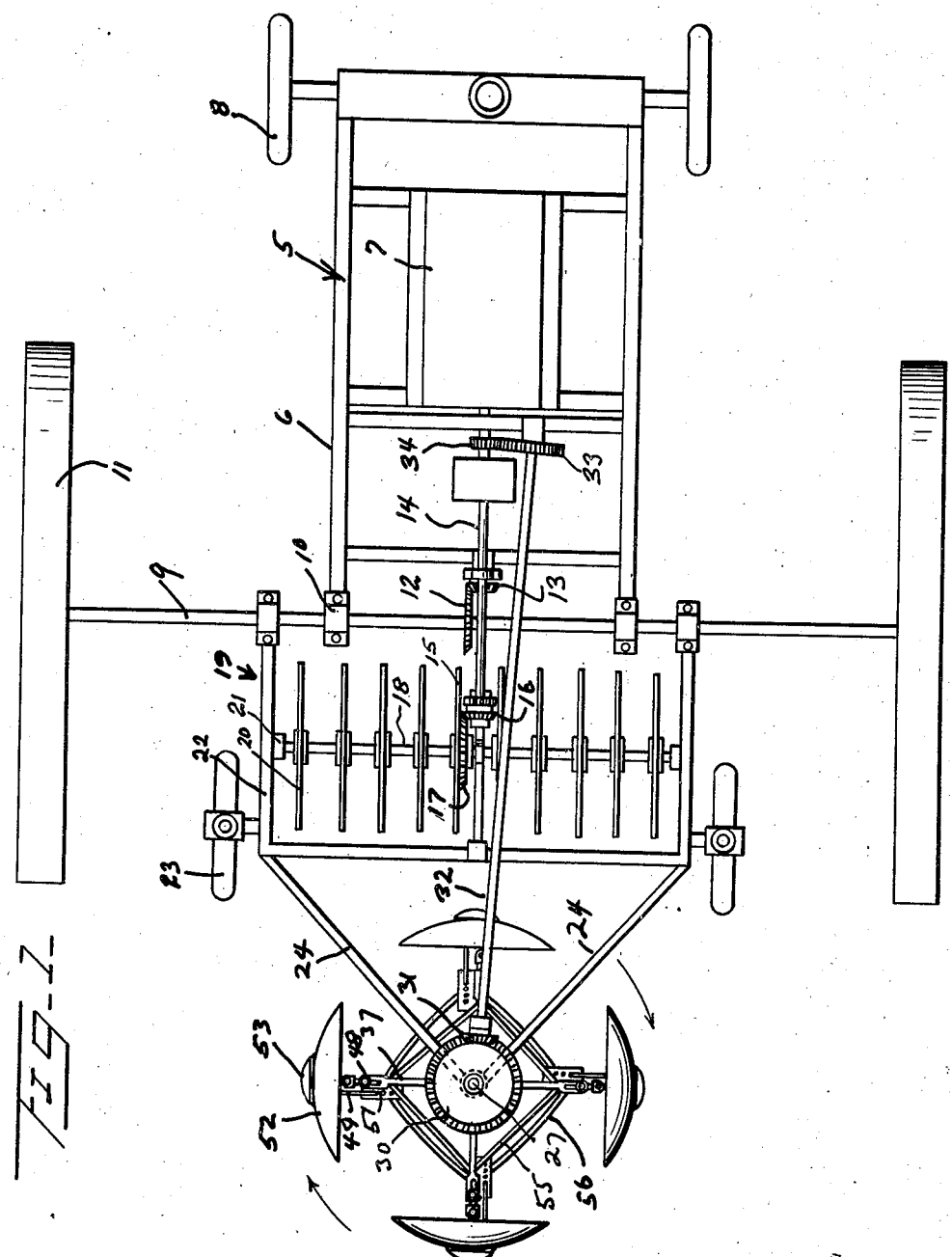

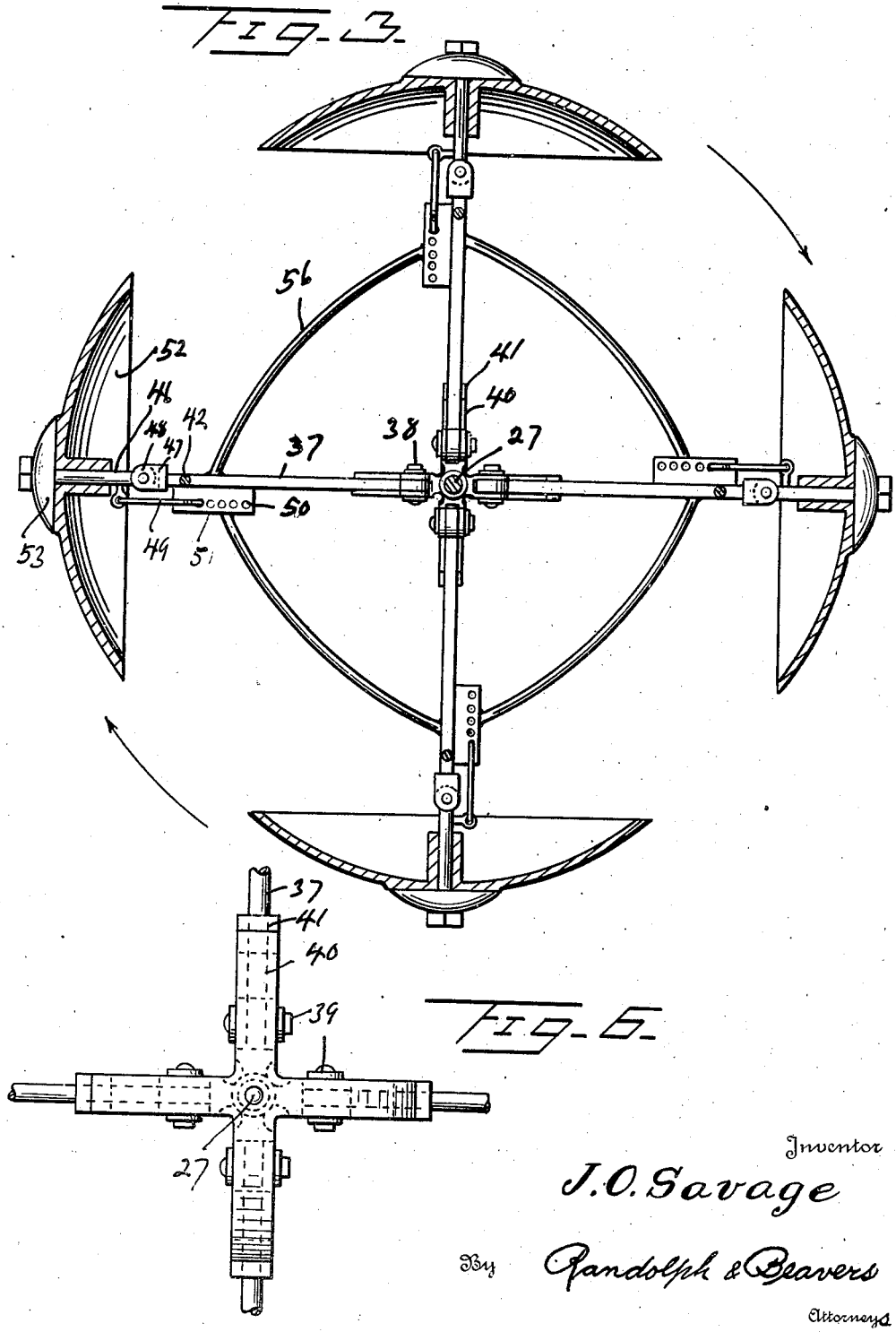

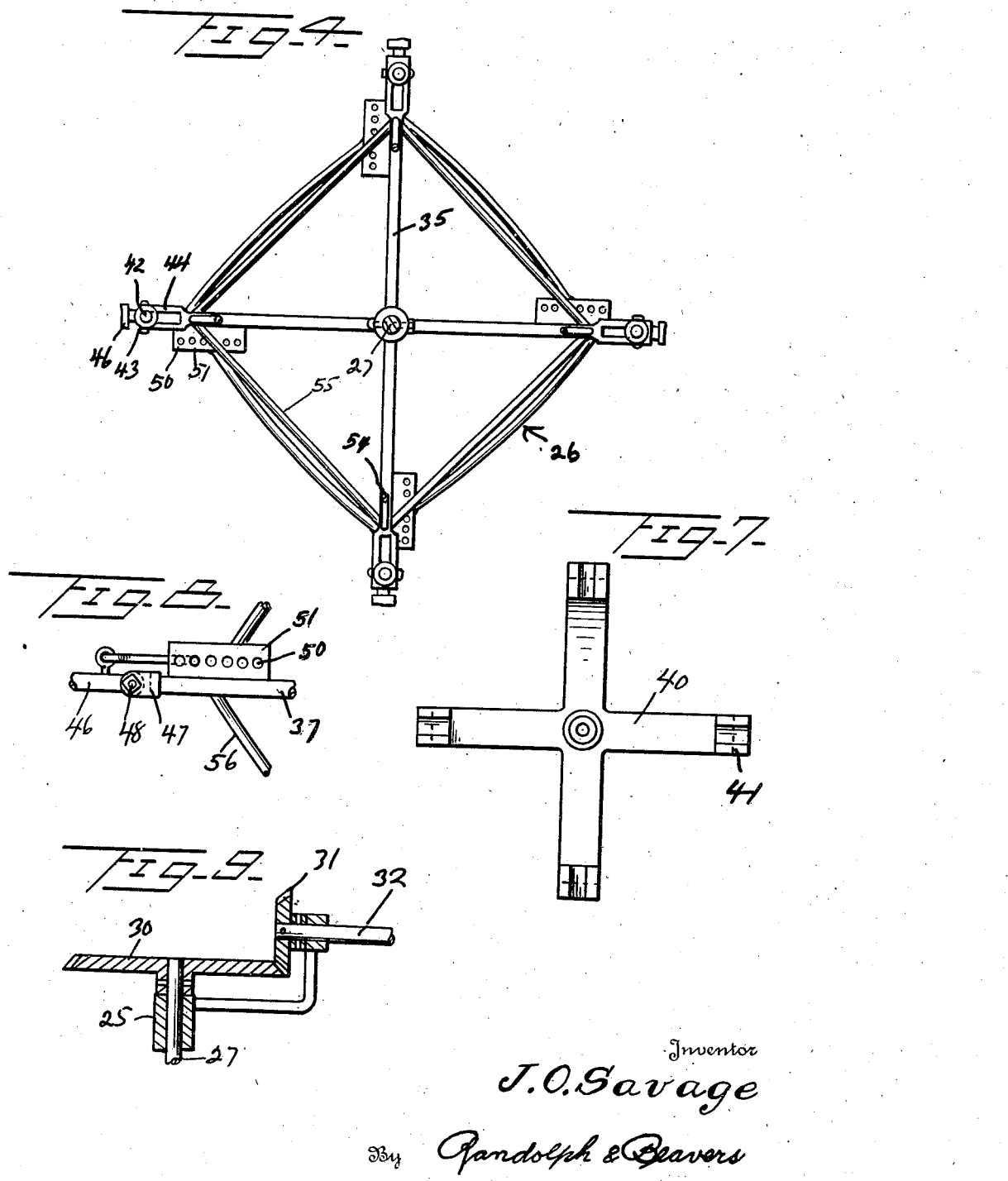

Patented Oct. 21, 1947

2,429,298

UNITED STATES PATENT OFFICE 2,429,298

PULVERIZING DISC PLOW

John O. Savage, Trenton, N. J.

Application October 8, 1945, Serial No. 620,876

7 Claims. (Cl. 97—43)

The present invention relates to new and useful improvements in agricultural implements and more particularly to the art of harrows.

Present day harrows do not pulverize the earth to the depth of the plow action, but simply act on the upper soil. The clods and other formations just below the surface are generally not touched by present day harrows and when seed falls on these formations, there is not sufficient moisture adjacent thereto to encourage or even permit germination thereof. These "stands" or bulk formations in time will dry and flake off, dislodging any seed that may have come to rest thereon, causing the seed to fall to a new position, disrupting a natural growth thereof, usually falling or being displaced into a non-moist surrounding.

Upon the theory that moisture that is inherent in the soil is not lost when the soil is finely pulverized, it is the principal object of the present invention to provide a harrow, which breaks the soil to a minuteness and to substantially the same depth as that of the breaking action.

Another object of the invention is to provide a breaking and pulverizing plow which has an action intended to cut into clods as the plow assembly rotates, thus alleviating any tendency of the assembly to push aside the clods and other formations.

Still another important object of the invention is to provide a breaking and pulverizing plow wherein the earth engaging elements are so set as to cause the elements to cut through clods and other breakable formations, but which has sufficient resiliency to permit yielding of the element when it comes into contact with such solid formations as rocks, roots, etc.

Still a further object of the invention is to provide a breaking and pulverizing plow wherein the plow elements can be set at various angular positions to afford the best pulverizing action with respect to the soil.

These and various other objects and advantages of the invention will become apparent to the reader of the following description.

In the drawings:

Figure 1 is a top plan view of the machine;

Figure 2 is a cross sectional view through the breaker and pulverizer assembly;

Figure 3 is a horizontal sectional view taken on line 3—3 of Figure 2;

Figure 4 is a section taken on line 4—4 of Figure 2;

Figure 5 is a fragmentary detailed sectional view showing the adjusting means for the ground engaging elements;

Figure 6 is a fragmentary bottom plan view of the arm supporting spider;

Figure 7 is a top plan view of the arm supporting spider;

Figure 8 is a fragmentary top plan view showing the adjusting means disclosed in Figure 5;

Figure 9 is a fragmentary vertical sectional view of the assembly drive.

Referring to the drawings wherein like numerals designate like parts, it can be seen that numeral 5 generally refers to a tractor which preferably has a chassis 6 on which a power plant 7 is mounted. This tractor has the usual steerable wheels 8 and may have a driver's seat and other facilities and adjuncts not necessary to be shown in the drawings.

An elongated axle 9 is disposed through bearings 10 at the rear of the frame 6 and has traction wheels 11 at the ends thereof.

On the axle 9 is a bevel gear 12 with which meshes a bevel pinion 13 which is geared to a drive shaft 14 from the power plant 7.

The shaft 14 through gear 15 drives a bevel pinion 16, meshing with a bevel gear 17 secured to a shaft 18, which forms part of a soil cutting assembly generally referred to by number 19, and which is further made up of a plurality of plane cutting discs 20, suitably secured to the shaft 18, this shaft being journaled at its end in bearings 21, at the ends of a frame 22, which is carried by the axle 9 and in any other suitable manner drawn by the tractor 5. The frame 22 is preferably supported by caster wheels or the like 23.

Arms 24 extend rearwardly and convergingly to be welded or otherwise secured to a vertical bearing sleeve 25, forming part of a breaker and pulverizing assembly generally referred to by numeral 26.

Extending vertically through the sleeve 25 is a shaft 27. On the shaft 27 below the sleeve 25 is a collar 28 secured thereto by bolts or the like 29, while above the sleeve 25 and on the shaft 27 is a bevel gear 30 with which meshes a bevel pinion 31 carried at the rear end of an elongated shaft 32, which at its forward end has a bevel gear 33 meshing with a bevel pinion 34 of the power plant drive.

The assembly 26 further includes upper and lower horizontally disposed frames, the upper frame being made up of four arms 35 radiating from a hub 36 secured to the lower portion of the shaft 27, while the lower frame is made up of a plurality of arms 37 hinged as at 38 to a hub 39 on the lower portion of the shaft 27 and substantially below the hub 36.

A four pronged spider 40 is suitably secured to the lower extremity of the shaft 27 and has its prongs curved upwardly and provided with grooved terminal portions 41 for the partial reception of the arms 37, whereby the arms may be supported in horizontal position as can be readily seen in Figure 2.

The outer ends of the hinged arms 37 are provided with upstanding pins 42 preferably provided with stop collars 43 at their upper ends. The pins 42 extend upwardly through slotted heads 44 on the arms 35.

Convoluted on the pins 42 are compression springs 45 interposed between the adjacent ends of the arms 35, 37. Thus the arms 37 are held in a position against the spider 40, and will only yield when the assembly strikes some solid matter such as a rock, roots, etc.

Each of the arms 37 has a spindle 46 at its outer end pivoted horizontally thereto through the medium of a yoke 47 on the arms and a pin 48 disposed through the interlapping portions of the yoke and spindle. (See Figure 5.)

To permit angular setting of the first engaging element, the spindle 46 is provided with a loosely held hook or catch 49 which is engageable in any one of a number of openings 50 in a flange 51 on one side of the arm 37. This catch 47 bridges the spindle and arm at the pivotal connection so as to rigidify this connection at the desired adjusted positioning thereof.

A concave-convex shaped disc 52 is provided on each spindle 46 and a nut held cap plate 53 is provided on each spindle to prevent displacement of the corresponding disc.

The upper frame 35 is braced to the collar 28 by bars 54 and inclined brace members 55 are deposed between the lower and upper ends adjacent braced bars 54 to thoroughly reinforce this part of the assembly 26.

Connecting rods 56 connect the outer ends of the arms 37 and are sufficiently flexible to permit individual accommodating actions of the discs 52.

In the operation of the machine, it can now be seen, that when the tractor or draft machine 5 is in operation, the power plant 7 not only drives the machine through the wheels 11, but also by way of the shaft 14, the comminuting discs 20 cut through the earth while the shaft 32 drives the assembly 26. By way of the gears 31, 30 the vertical shaft 27 is rotated, carrying with it the breaking and pulverizing assembly 26. Preparatory to utilizing the assembly 26, or after a short run thereof, the discs 52 may be properly toed by setting the catch with respect to the perforated plate or flange 51, thus rigidifying the connection between the spindle 46 and the arms 37 at the proper angular relation, this being so, that the discs in being carried by the assembly 26 will cut through any sub-surface clods rather than simply ride against the same or push the same aside. This would undoubtedly be true if the discs were left co-axial with the corresponding arms 37. This co-axial positioning of the discs is shown in Figure 3, but in actual use, the discs would be toed outwardly and held there by the catch means 49, 50.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A pulverizing harrow comprising a rotary assembly, said assembly being provided with outstanding arms and a ground engaging disc carried by each of the arms, each of said discs being provided with adjusting means whereby the same can be toed, a hub, a vertical drive shaft on which the hub is secured, said arms being hingedly secured to the hub, a spider having pronged portions, said spider being mounted on the lower end of the vertical shaft and having its prongs disposed in position to support said arms.

2. A pulverizing harrow comprising a rotary assembly, said assembly being provided with outstanding arms and a ground engaging disc carried by each of the arms, each of said discs being provided with adjusting means whereby the same can be toed, a hub, a vertical drive shaft on which the hub is secured, said arms being hingedly secured to the hub, a spider having pronged portions, said spider being mounted on the lower end of the vertical shaft and having its prongs disposed in position to support said arms, an elevated frame mounted on said assembly and vertically spaced from said arms and yieldable means interposed between the outer ends of the arms and the frame.

3. A pulverizing harrow comprising a rotary assembly, said assembly being provided with outstanding arms and a ground engaging disc carried by each of the arms, each of said discs being provided with adjusting means whereby the same can be toed, a hub, a vertical drive shaft on which the hub is secured, said arms being hingedly secured to the hub, a spider having pronged portions, said spider being mounted on the lower end of the vertical shaft and having its prongs disposed in position to support said arms, an elevated frame mounted on said assembly and vertically spaced from said arms and yieldable means interposed between the outer ends of the arms and the frame, said yieldable means consisting of pins extending upwardly from the arms, said frame being formed with slots receiving said pins and compression springs on the pins interposed between the arms and the frame.

4. In a pulverizing harrow, a vertical shaft, drive means for the shaft, a frame fixedly mounted on said shaft and rotatable therewith, a hub on the shaft adjacent the lower end thereof, arms pivotally secured to the hub, brace members extending outwardly from the lower end of the shaft and supporting the said arms in horizontal position, spring means interposed between the outer ends of the arms and said frame, and ground working elements carried by the outer ends of the arms.

5. In a pulverizing harrow, a vertical shaft, drive means for the shaft, a frame fixedly mounted on said shaft and rotatable therewith, a hub on the shaft adjacent the lower end thereof, arms pivotally secured to the hub, brace members extending outwardly from the lower end of the shaft and supporting the said arms in horizontal position, spring means interposed between the outer ends of the arms and said frame, and ground working elements carried by the outer ends of the arms, and hinged connections between the ground working elements and the outer ends of the arms.

6. In a pulverizing harrow, a vertical shaft, drive means for the shaft, a frame fixedly mounted on said shaft and rotatable therewith, a hub on the shaft adjacent the lower end thereof, arms pivotally secured to the hub, brace members extending outwardly from the lower end of the shaft and supporting the said arms in horizontal position, spring means interposed between the outer ends of the arms and said frame, and ground working elements carried by the outer ends of the arms, said elements being hingedly connected to the ends of the arms, each of the elements being provided with a hook member extending inwardly, each arm being provided with a plurality of longitudinally spaced openings with which the corresponding hook is selectively disposed.

7. In a pulverizing harrow, a vertical shaft, drive means for the shaft, a frame fixedly mounted on said shaft and rotatable therewith, a hub on the shaft adjacent the lower end thereof, arms pivotally secured to the hub, brace members extending outwardly from the lower end of the shaft and supporting the said arms in horizontal position, spring means interposed between the outer ends of the arms and said frame, and ground working elements carried by the outer ends of the arms, said spring means for each arm consisting of a vertically disposed rod, said frame being formed with a slot for each of the rods and through which the corresponding rod is disposed and a compression spring on each rod having its ends impinging against the frame and one of the arms.

JOHN O. SAVAGE.

REFERENCES CITED

The following references are of record in the file of this patent:

UNITED STATES PATENTS

| Number | Name | Date |
|---|---|---|
| 901,605 | Ferriss | Oct. 20, 1908 |